March 24, 1925.
V. E. HUGONIOT
HOT AIR FURNACE
Filed May 31, 1923
1,531,251
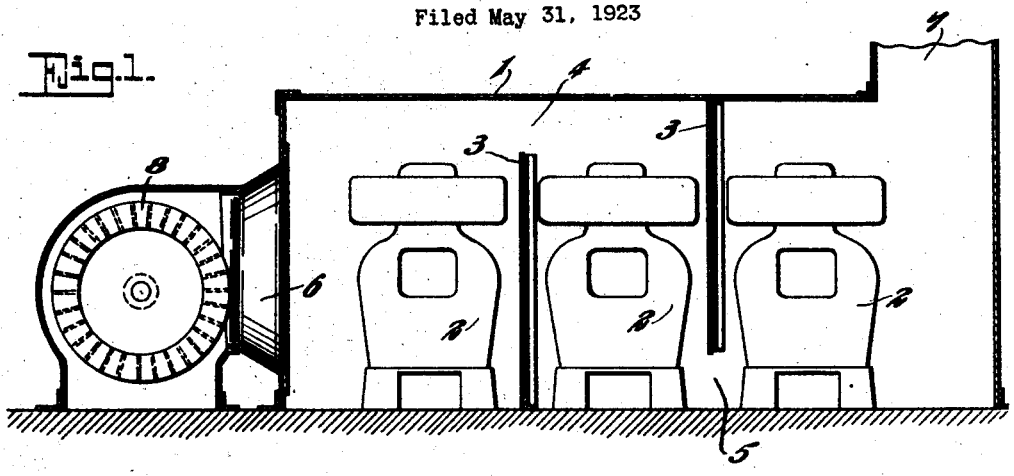
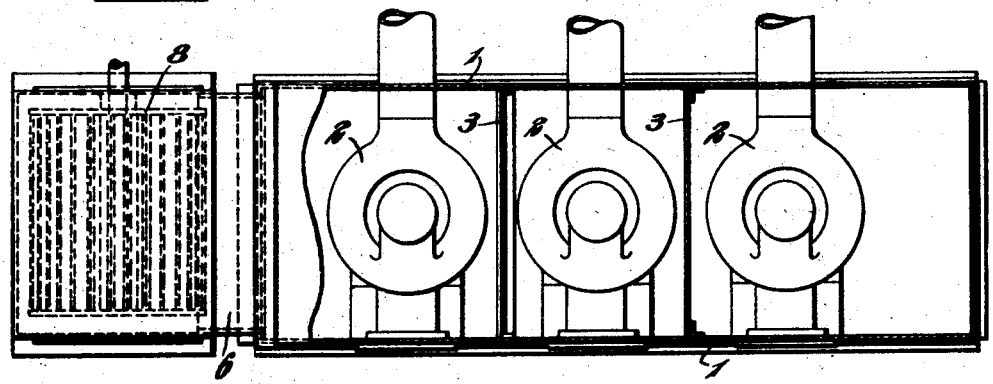
Inventor.
Victor E. Hugoniot.

Patented Mar. 24, 1925.

1,531,251

UNITED STATES PATENT OFFICE.

VICTOR E. HUGONIOT, OF ST. LOUIS, MISSOURI, ASSIGNOR TO SUPREME HEATER AND VENTILATING CORPORATION, OF ST. LOUIS, MISSOURI, A CORPORATION OF MISSOURI.

HOT-AIR FURNACE.

Application filed May 31, 1923. Serial No. 642,589.

*To all whom it may concern:*

Be it known that I, VICTOR E. HUGONIOT, a citizen of the United States, and residing at St. Louis, State of Missouri, have invented the new and useful Improvement in Hot-Air Furnaces, of which the following is a specification.

This invention relates to heating apparatus, and more particularly to furnaces designed for heating comparatively large buildings.

In order to heat fairly large buildings, such as schools, auditoriums, etc., a comparatively large heating unit is necessary in order to take care of the heating requirements in the coldest weather liable to be met with. When a heating installation is made which is large enough to take care of the extremely cold weather requirements, the normal heating requirements will be considerably less than the full capacity of the plant. Furthermore in comparatively warm weather, such as is frequently met with in some climates when it is too cold to allow the building to be without heat and not yet cold enough to require more than slight heating to provide comfort, such a large heating plant must be operated at a very low efficiency. Under these conditions a small fire must be kept in a large furnace, and under such conditions it is impossible to prevent a considerable waste of fuel. Furthermore it is often nearly impossible to prevent overheating the building in order to keep a sufficient fire to maintain the plant in operation.

One of the objects of this invention, therefore, is to provide a heating plant of which the heating capacity is variable so that the plant may be operated at a high efficiency over a wide range of outside temperature.

Another object of this invention is to provide a plant in which a small fire may be efficiently operated at times when a small amount of heat is required, but in which the heating capacity may be increased to meet increased requirements.

Another object of this invention is to provide a plant having a series of heating units which may be put into operation progressively in accordance with the heating requirements.

Further objects will appear from the detail description taken in connection with the accompanying drawing, in which:

Figure 1 is a vertical longitudinal section of a heating plant embodying this invention; and Figure 2 is a horizontal section of the same.

In accordance with this invention a heating plant is provided which comprises an elongated casing 1 which may be of metal or other suitable material and which may be lined with suitable heat insulating material so as to prevent the loss of heat by radiation from the casing. Within the casing 1 a series of heating units 2 is arranged, each unit being spaced from the walls of the casing so as to provide a space around the unit for circulation of air therearound. These heaters are arranged in a row or in tandem formation. Between the heaters 2 vertical partitions 3 are arranged so as to divide the casing into a series of compartments, each containing a heating unit. These partitions terminate alternately short of the top and bottom of the casing. There are thus provided openings or passages 4 and 5 connecting adjacent compartments so that the air may pass from one compartment to another through these openings. A cold air inlet 6 is provided at one end of the casing and a hot air outlet 7 is provided at the other end. A fan or blower 8 may be provided either at the inlet or at the outlet so as to induce a forced draft through and along the casing.

In the operation of this device the fan 8 may be operated to induce a draft of air through the casing. This air enters at the inlet 6 and passes successively through the compartments formed by the partitions 3 and out at the outlet 7 to the rooms of the building which are to be heated. The partitions serve to guide the air so as to pass the same in contact with the heating surfaces of the various heating units successively from the inlet end to the outlet end of the casing. The vertical arrangement of the partitions provides for passing the air vertically over the heaters so that it may come into intimate contact with all the heating surfaces of each unit. It will be appreciated that without these partitions the air would pass horizontally along the casing and around the heaters. It is easy to see that in such a case the entire heating surfaces of every unit would not be efficiently utilized. The air would take a diagonal course from the lower part of the casing at the inlet to the upper part of the casing at the outlet passing in comparatively straight stream lines past the heating units. Each unit would, therefore, provide a shield for the one behind it so as to prevent the air from coming in contact with the shielded surface. There would thus be formed on each heating unit a protected zone practically out of contact with the circulating air. The effect of this would be to produce uneven heating of the heaters, those parts in contact with the air being cooled more than the shielded parts so that there would be serious danger of overheating the latter parts. The arrangement in which the air is passed vertically over the heating surfaces insures that each heater will be brought uniformly into contact with the air which may circulate about all the surfaces as the air passes upward or downward through each compartment.

When this plant is operated during comparatively warm weather, it may be necessary to fire only one of the heaters 2. In that case that unit which is nearest to the outlet 7 would be first put into use. When operating in this way the cold air entering at the inlet 6 would pass first over the inactive units and last over the active unit before being delivered to the rooms to be heated. If any other unit were put into operation first, the heated air would have to pass over a cold unit in its subsequent travel to the outlet 7, so that a chilling effect would be obtained which would be undesirable. As the weather grows colder, successive units may be put into use to provide additional heating capacity. As many units may be then put into operation as may be necessary to properly heat the building. The units are put into use progressively from the outlet to the inlet end of the casing so that none of the chilling effect above mentioned will be met with.

It will be evident that this invention provides a heating plant of which the capacity may be adjusted to suit the heating requirements. Just as many units as are necessary may be put into operation as each unit is separately fired, a good fire being maintained in each so that the highest efficiency in the use of fuel may be maintained. Keeping a good fire will also insure more efficient combustion and considerably less smoke. It will be noted further that with a plant embodying this invention adequate capacity may be installed to take care of heating requirements in the most severe weather so that the plant may be operated during such severe weather without destructively overheating the units. At the same time the units are small enough so that by the operation of a less number thereof the requirements for mild weather may be taken care of at a high efficiency of operation.

It is obvious that various changes may be made in details of construction without departing from the spirit of this invention; it is, therefore, to be understood that this invention is not to be limited to the specific details shown and described.

Having thus described the invention, what is claimed is:

1. A hot air furnace comprising, an elongated casing, a series of air heaters arranged in tandem along said casing and spaced therefrom and relatively so as to provide an air heating space, a cold air inlet at one end of said casing, a hot air outlet at the other end of said casing, and partitions in said casing and between said heaters constructed and arranged to guide the air successively in contact with the heating surfaces of the successive heaters, whereby said heaters may be brought into use progressively from the outlet to the inlet ends of said casing in accordance with the heating requirements.

2. A hot air furnace comprising, an elongated casing, a series of air heaters arranged in tandem along said casing and spaced therefrom and relatively so as to provide an air heating space, a cold air inlet at one end of said casing, a hot air outlet at the other end of said casing, and vertically arranged partitions in said casing and between said heaters and terminating alternately short of the top and the bottom thereof in order to guide the air successively in contact with the heating surfaces of the successive heaters, whereby said heaters may be brought into use progressively from the outlet to the inlet ends of said casing in accordance with the heating requirements.

3. A hot air furnace comprising, an elongated casing, a series of air heaters arranged in tandem along said casing and spaced therefrom and relatively so as to provide an air heating space, a cold air inlet at one end of said casing, a hot air outlet at the other end of said casing, partitions in said casing and between said heaters constructed and arranged to guide the air successively in contact with the heating surfaces of the successive heaters, and means for causing a forced draft along said casing from the inlet to the outlet thereof, whereby said heaters may be brought into use progressively from the outlet to the inlet ends of said casing in accordance with the heating requirements.

4. A hot air furnace comprising, an elongated casing, a series of air heating units arranged in tandem along said casing and spaced therefrom and relatively so as to provide an air heating space, a cold air inlet at one end of said casing, a hot air outlet at the other end of said casing, and partitions in said casing and between said units constructed and arranged to provide a plurality of heating compartments arranged in series and each containing a heating unit, and through which compartments the air may be passed successively in contact with the heating surfaces of the units therein.

5. A hot air furnace comprising, an elongated casing, a series of air heating units arranged in tandem along said casing and spaced therefrom and relatively so as to provide an air heating space, a cold air inlet at one end of said casing, a hot air outlet at the other end of said casing, partitions in said casing and between said units constructed and arranged to provide a plurality of heating compartments arranged in series and each containing a heating unit, and through which compartments the air may be passed successively in contact with the heating surfaces of the units therein, and means for causing a forced draft along said casing from the inlet to the outlet thereof, whereby said units may be brought into use progressively from the outlet to the inlet ends of said casing in accordance with the heating requirements.

In testimony whereof I affix my signature this 26th day of May, 1923.

VICTOR E. HUGONIOT.